April 10, 1928.  1,665,536
W. A. DIERKER
MOTOR VEHICLE BUMPER
Filed Aug. 17, 1927  2 Sheets-Sheet 1

Inventor
W. A. Dierker.
By Lacey & Lacey, Attorneys

April 10, 1928.

W. A. DIERKER 1,665,536

MOTOR VEHICLE BUMPER

Filed Aug. 17, 1927

Inventor

W. A. Dierker.

By Lacey & Lacey, Attorneys

Patented Apr. 10, 1928.

1,665,536

UNITED STATES PATENT OFFICE.

WILLIAM A. DIERKER, OF BROOKLYN, NEW YORK.

MOTOR-VEHICLE BUMPER.

Application filed August 17, 1927. Serial No. 213,677.

The present invention is directed to improvements in bumpers for motor vehicles.

The primary object of the invention is to provide a bumper for motor vehicles so constructed that the same can be conveniently attached to the frame and when in place will afford protection against side blows and collisions with other vehicles.

Another object of the invention is to provide a device of this character which is simple in construction, durable, and one which can be manufactured at a very small cost.

Figure 1:
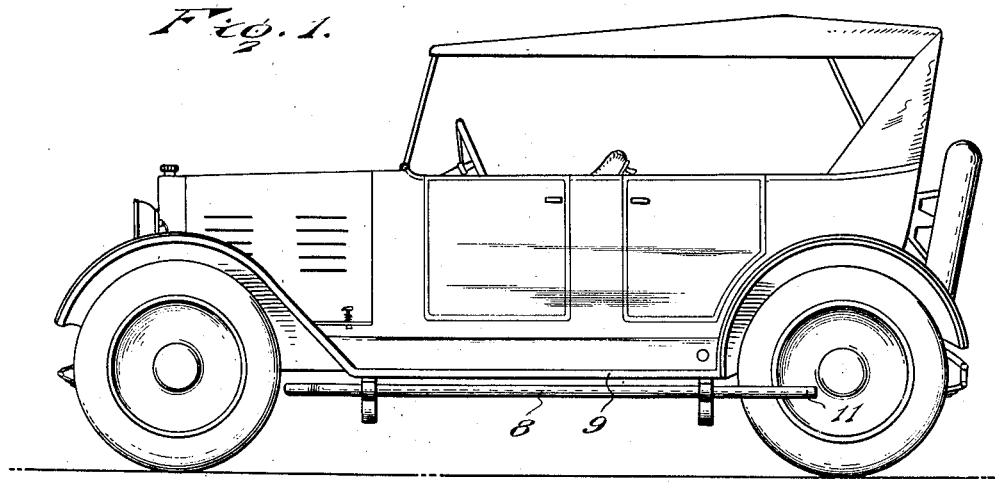
Figure 1 is a side elevation of the bumper showing it in place upon an automobile.
Figure 2:
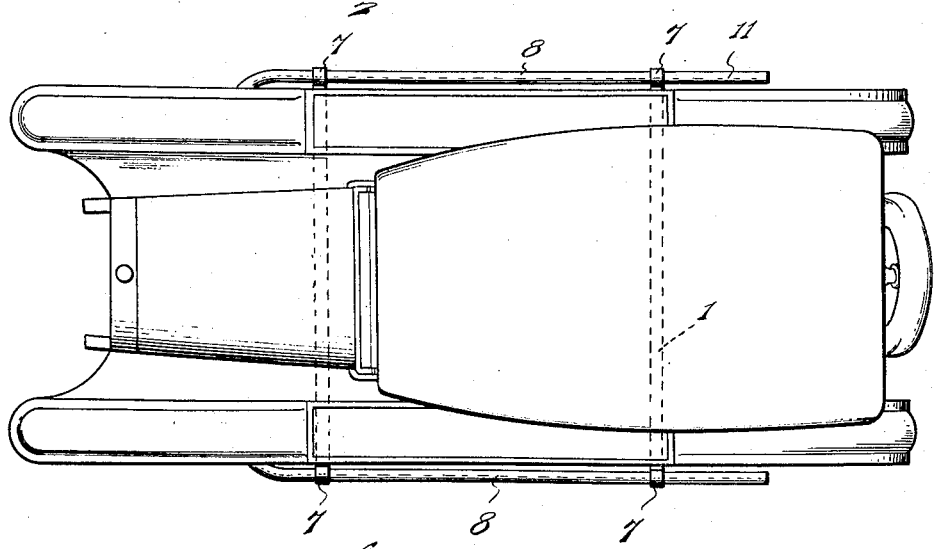
Figure 2 is a top plan view thereof.
Figure 6:
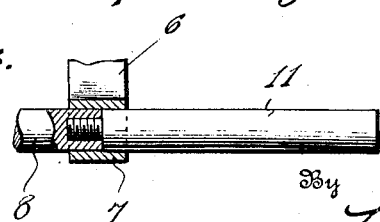
Figure 6 is a detail view of the removable end.
Figure 3:
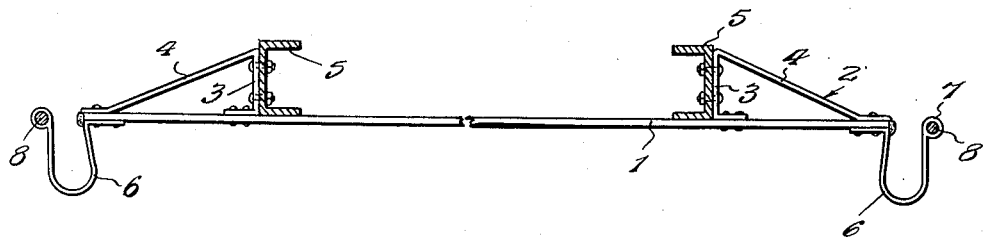
Figure 3 is a transverse sectional view through the side sills of a motor vehicle showing the bumper in place thereon.
Figure 4:
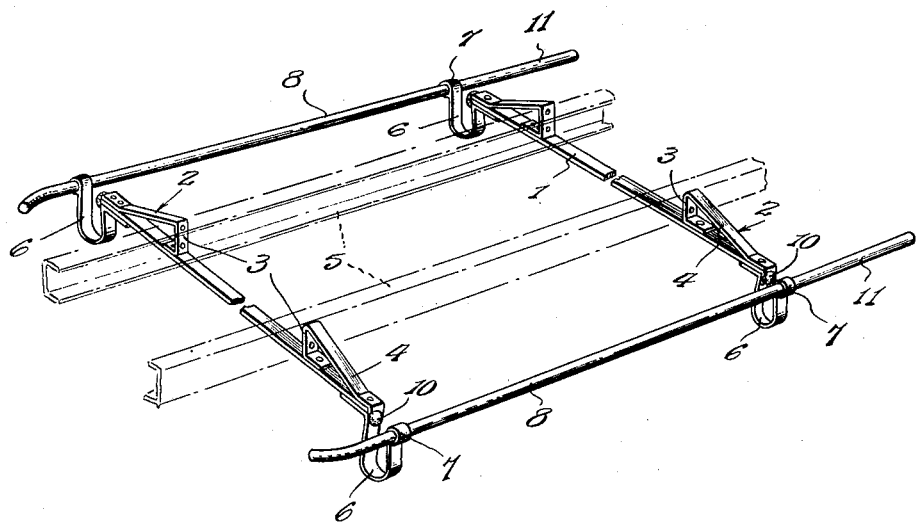
Figure 4 is a perspective view of the bumper and its associated parts.
Figure 5:
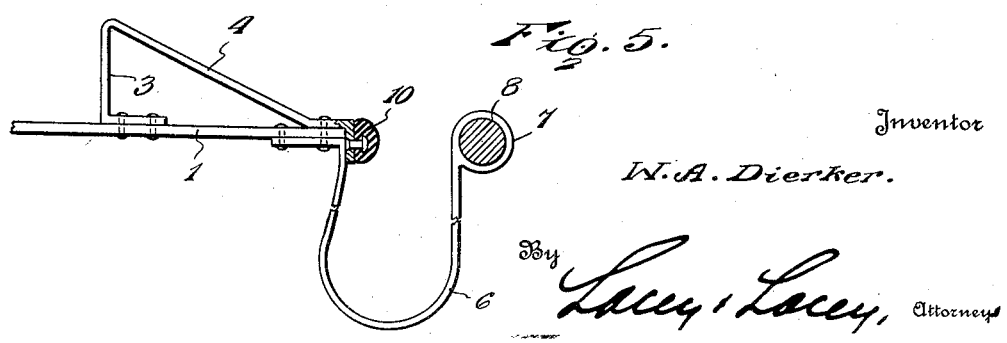
Figure 5 is a detail enlarged elevational view partly in section.

The bumper consists of a pair of cross bars 1 having brackets 2 which consists of vertical bars 3 which have their inner ends fixed to the bars 1, the upper ends thereof terminating in downwardly inclined bars 4, the outer ends of which are fixed to the bars 1 and serve effectively as braces.

The brackets 2 are placed so that the bars 3 thereof will rest against the outer sides of the side sills 5 of the vehicle and are bolted thereto, and at which time the bars 1 engage under the sills 5.

Having their inner ends fixed to the ends of the bars 1 are spring steel loops 6, said loops having collars 7 upon their outer ends and in which are fixed the bumper rods 8 which are so arranged that they lie along the running board 9 of the vehicle.

The ends of the bars 1 have mounted thereon rubber buffers 10 to absorb shock when the bars 8 are forced inwardly under impact.

From the foregoing description it will be apparent that when an obstacle is struck or another car collides with the vehicle equipped with the bumper the rods 8 will be permitted to yield owing to the presence of the loops 6, thus absorbing the shock, and should the impact be of great force the buffers 10 will aid in relieving the shock, thus preventing injury to the running boards of the vehicle equipped with the bumper.

The rear ends of the bumper rods 8 have sections 11 threaded thereto, and are removable to permit the tires of the rear wheels to be changed without interference.

Having thus described the invention, I claim:

The combination with the side sills of an automobile frame, of a pair of bars secured transversely thereof, resilient loops carried by the outer ends of the bars, and having collars carried thereby, bumper rods engaged in the collars, and rubber buffers carried by the ends of the bars, as and for the purpose set forth.

In testimony whereof I affix my signature.

WILLIAM A. DIERKER. [L. S.]